US012784459B2

(12) United States Patent
Dobberphul

(10) Patent No.: US 12,784,459 B2
(45) Date of Patent: Nov. 3, 2026

(54) METHOD FOR EXECUTING A SAFETY-RELEVANT FUNCTION OF A VEHICLE, COMPUTER PROGRAM PRODUCT, AND VEHICLE

(71) Applicant: Volkswagen Aktiengesellschaft, Wolfsburg (DE)

(72) Inventor: Timo Dobberphul, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 151 days.

(21) Appl. No.: 18/699,195

(22) PCT Filed: Sep. 9, 2022

(86) PCT No.: PCT/EP2022/075146

§ 371 (c)(1),
(2) Date: Apr. 5, 2024

(87) PCT Pub. No.: WO2023/057169

PCT Pub. Date: Apr. 13, 2023

(65) Prior Publication Data

US 2024/0404295 A1 Dec. 5, 2024

(30) Foreign Application Priority Data

Oct. 8, 2021 (DE) ......................... 102021211357.5

(51) Int. Cl.
*G06V 20/56* (2022.01)
*B60W 60/00* (2020.01)
(Continued)

(52) U.S. Cl.
CPC ......... *G06V 20/56* (2022.01); *B60W 60/0015* (2020.02); *G06V 10/774* (2022.01); *G06V 10/82* (2022.01)

(58) Field of Classification Search
CPC ...... G06V 20/56; G06V 10/774; G06V 10/82; B60W 60/0015
See application file for complete search history.

(56) References Cited

U.S. PATENT DOCUMENTS

2019/0018415 A1* 1/2019 Netter .............. G08G 1/096725
2019/0213451 A1 7/2019 Schafer et al.
(Continued)

FOREIGN PATENT DOCUMENTS

CN 102646332 A * 8/2012
DE 102018221063 A 6/2020
(Continued)

OTHER PUBLICATIONS

Machine Translation of CN-102646332-A (Year: 2012).*
(Continued)

*Primary Examiner* — Sahar Motazedi
(74) *Attorney, Agent, or Firm* — Peter Zura; LOZA & LOZA, LLP

(57) ABSTRACT

Technologies and techniques for executing a safety-relevant function of a vehicle in a current driving situation) of the vehicle depending on input data, which are evaluable by a control system with multiple evaluation units configured to evaluate the input data utilizing artificial intelligence, in which the evaluation units are trained by training data at least to a predefined confidence level in each case for a specific driving situation. An associated computer program product and a vehicle utilizing the technologies and techniques are further disclosed.

20 Claims, 3 Drawing Sheets

(51) Int. Cl.
*G06V 10/774* (2022.01)
*G06V 10/82* (2022.01)

(56) References Cited

U.S. PATENT DOCUMENTS

| | | | | |
|---|---|---|---|---|
| 2019/0291720 | A1 | 9/2019 | Xiao et al. | |
| 2020/0183391 | A1* | 6/2020 | Hüger | G06Q 50/40 |
| 2020/0202167 | A1* | 6/2020 | Gross | G06V 10/82 |
| 2020/0249315 | A1 | 8/2020 | Eshet et al. | |
| 2020/0269875 | A1* | 8/2020 | Wray | B60W 60/0011 |
| 2020/0394458 | A1 | 12/2020 | Yu et al. | |
| 2022/0126877 | A1* | 4/2022 | Carroll | B60W 60/0053 |
| 2022/0319312 | A1* | 10/2022 | Mintz | G07B 15/063 |
| 2023/0041279 | A1* | 2/2023 | Raichelgauz | G06N 20/20 |

FOREIGN PATENT DOCUMENTS

| | | | |
|---|---|---|---|
| EP | 3671550 | A1 | 6/2020 |
| EP | 3772710 | A | 2/2021 |

OTHER PUBLICATIONS

PCT/EP2022/075146. International Search Report (Jan. 9, 2023).

Pomerlau et al. "Combining artificial neural networks and symbolic processing for autonomous robot guidance." Engineering Applications of Artificial Intelligence. vol. 4:4, pp. 279-285 (1991).

Pomerlau, "Reliability estimate for neural network based autonomous driving." 8279 Robotics and Autonomous Systems, (Apr. 12, 1994).

Anonymous: "Künstliche Intelligenz-Wikipedia" (Oct. 18, 2022). https://de.wikipedia.org/wiki/Künstliche_Intelligenz.

* cited by examiner

METHOD FOR EXECUTING A SAFETY-RELEVANT FUNCTION OF A VEHICLE, COMPUTER PROGRAM PRODUCT, AND VEHICLE

The present application claims priority to International Patent Application No. PCT/EP2022/075146 to Timo Dobberphul, filed Sep. 9, 2022, titled "Method For Executing A Safety-Relevant Function Of A Vehicle, Computer Program Product, And Vehicle," which claims priority to German Pat. App. No. DE 10 2021 211 357.5, filed Oct. 8, 2021, the contents of each being incorporated by reference in their entirety herein.

TECHNICAL FIELD

Technical Field

The present disclosure relates to technologies and techniques for executing a safety-relevant function of a vehicle in a current driving situation of the vehicle, depending on input data, as well as an associated computer program and a vehicle.

Background

It is known that neural networks are particularly suited for detection and classification tasks in image data. These tasks can often not be done with conventional algorithms. Neural networks are, as a rule, trained by means of training data for this and can transfer what is learned in practice to new inputs.

Which properties the of the input space lead to making a decision in the network is largely unknown, at least in part. Furthermore, the complexity of the reality portrayed often results in infinite or practically infinite possibilities as to how the input data can look. This is also known as the "open world problem".

Specifically for safety-relevant functions, however, it is nevertheless desirable to produce predictable results. For example, it is known from US 2019/0291720 A1 to use specialized neural networks that are trained to execute a specific vehicle function.

SUMMARY

Aspects of the present disclosure are directed to addressing at least some of the above-cited disadvantages known from the prior at. Other aspects are directed to improving safety of a vehicle in a safety-relevant function, in particular by means of improved complexity management in the evaluation of the input data.

Some aspects of the present disclosure are provided in the subject matters of the independent claims, found below. Other aspects are disclosed in the subject matter of the respectively associated dependent claims, the description and the drawings. Features and details that are described in connection with the method according to the invention naturally also apply in connection with the computer program product according to the present disclosure and/or the vehicle and vice versa, so that in all cases with respect to the disclosure concerning the individual aspects of the invention, reciprocal reference is or can be made.

In some examples, a method is disclosed for executing a safety-relevant function of a vehicle in a current driving situation of the vehicle depending on input data that can be evaluated by a control system with multiple, preferably three or more, evaluation units for evaluating the input data by means of artificial intelligence is provided. The evaluation units are trained by training data at least to a predefined confidence level in each case for a specific function. For the method, the following, process steps, may be executed:

- capturing classification data of the input data, in particular by a logic unit of the control system,
- detecting the current driving situation depending on the classification data, in particular by the logic unit,
- determining a prioritized evaluation unit of the evaluation unit that is trained for a specific driving situation, that exhibits a preferably predefined correspondence with the current driving situation, in particular by the logic unit,
- evaluating the input data by the prioritized evaluation unit, and
- executing the safety-relevant function depending on the evaluation of the input data, in particular by the logic unit and/or a function unit of the vehicle.

In some examples, a computer program product is provided. The computer program product includes commands that, upon execution by a control system, cause the control system to execute methods according to the present disclosure.

Thus, a computer program according to the present disclosure brings with it the same advantages that are described in detail with reference to a method according to the present disclosure. The method may be a computer-implemented method in some examples. The computer program product can be implemented as a computer-readable instruction code. Further, the computer program product can be stored on a computer-readable storage medium such as a data disk, a removable drive, a volatile or non-volatile memory or a built-in memory/processor. Further, the computer program product can be available or provided in a network such as the internet, from which it can be download by a user if needed. The computer program product can be realized both by means of software as well as by means of one or more special electronic circuits, i.e. in hardware or in any desired hybrid form, i.e. by means of software components and hardware components.

In some examples, a vehicle is disclosed, wherein the vehicle includes a function unit for executing a safety-relevant function of the vehicle. Furthermore, the vehicle includes a control system with multiple evaluation units for evaluating input data for the safety-relevant function by artificial intelligence. The evaluation units are each trained by means of training data for a specific driving situation at least to a predefined confidence level.

Thus, a vehicle according to the present disclosure brings with it the same advantages as are described in detail with reference to the methods according to the present disclosure and/or a computer program product. The function unit can, for example, include a driver assistance system. Furthermore, it may be provided that the vehicle is an autonomously operated vehicle, in which the safety-relevant function includes an autonomous driving function. By means of the predefined confidence level, the autonomous driving at a high level of safety can be made possible. It is conceivable that the function unit is provided separately from the control unit or integrated into the control system.

Further advantages, features and particulars of the present disclosure may be appreciated from the following description in which exemplary embodiments are described in detail with reference to the drawings. Here the features mentioned in the claims and the description can each be material to the invention, either individually in themselves or in any combination desired.

DETAILED DESCRIPTION

Figure 1:
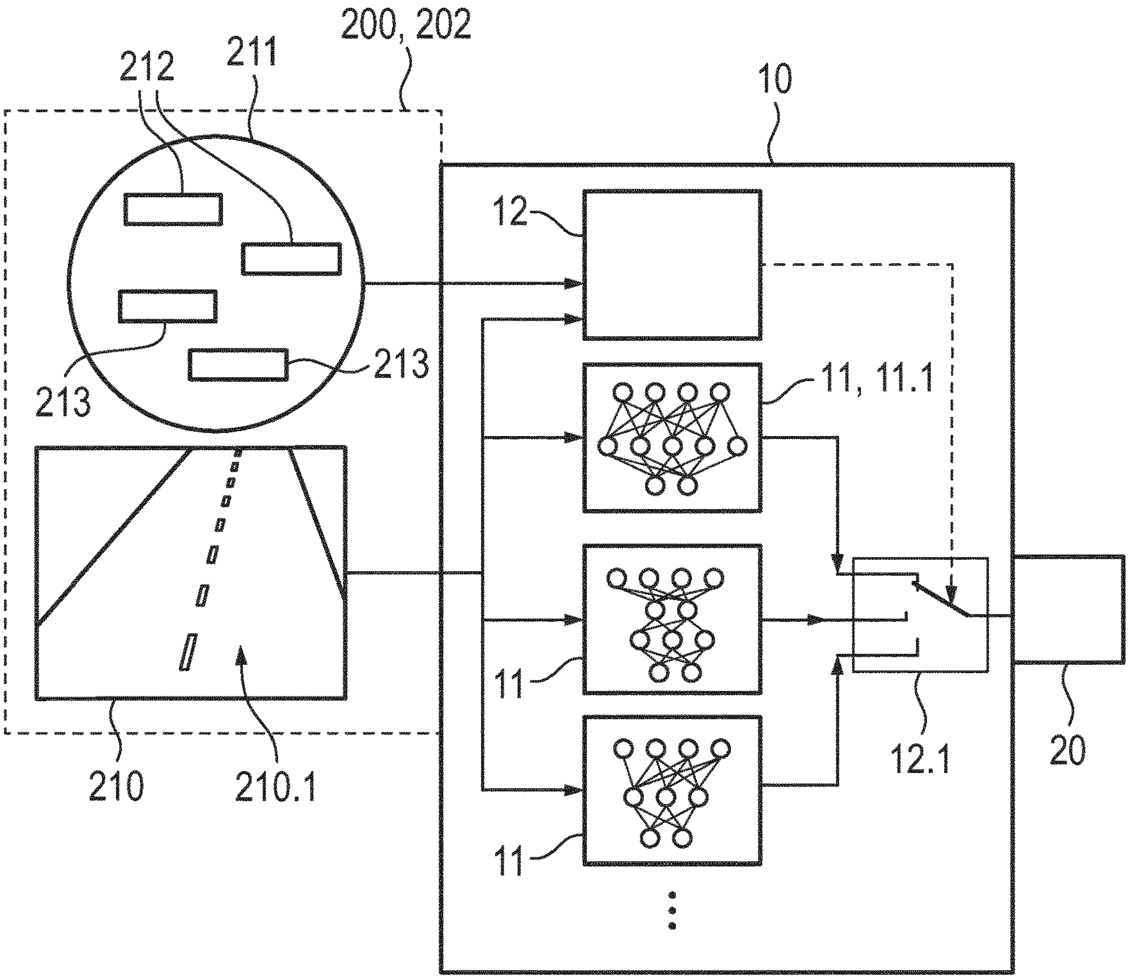
FIG. 1 illustrates a control system for executing a method according to the invention according to some aspects of the present disclosure.

In the following description of several exemplary embodiments, for the same technical features the identical reference numbers are also used in different exemplary embodiments.

As disclosed herein the vehicle is preferably a motor vehicle and/or an aircraft. The methods may be carried out during the operation of the vehicle. During the execution of the safety-relevant function the vehicle is in a "current driving situation", for example, in a current traffic situation.

In some examples, the control system can include a computing unit, in the form of a processor and/or microprocessor. Here the control system can be configured to control and/or regulate. Furthermore, the control system can include a central control device of the vehicle and/or a server. It is further conceivable that the control system is a distributed system and the control system is integrated into a cloud. The evaluation units can be configured as modules in hardware and/or software.

The input data may be sensor data of the vehicle for analyzing the current driving situation. Preferably, the input data, image data of a vehicle may be generated by a camera of the vehicle. The classification data can include a partial quantity of the input data. For example, the classification data can include image sections, image levels and/or the like of the input data. Upon detecting the current driving situation, the current driving situation can be classified. Preferably a single prioritized evaluation unit is determined for the complete sensor data. However, it is equally conceivable that the input data and/or classification data include sensor and/or are partial data of sensor data. For example, the input data can include an image section and/or a pixel of image data of the sensor data. Thus, for each image section and/or each pixel a prioritized evaluation unit can be determined separately.

Each of the evaluation units may be trained using an individual set of training data for evaluating the input data. The respective training data may be situation-specific for the specific driving situation. For example, one of the evaluation units can be trained for a specific driving situation that includes rainy weather, another of the evaluation units for a specific driving situation that includes snow, and another of the evaluation units for a specific driving situation that includes sunshine.

For evaluating the input data by the prioritized evaluation unit the control system, the logic unit, may be configured with a switching logic for routing the input data to the prioritized evaluation unit and/or from the prioritized evaluation unit to the function unit. The evaluation of the input data can, for example, include pedestrian detection, road condition detection, traffic detection and/or classification of traffic participants. The execution of the safety-relevant function may include the triggering of the safety-relevant function, the control of a function unit for the safety-relevant function and/or carrying out the safety-relevant function. The safety-relevant function can, for example, include influencing vehicle operation and/or the vehicle's travel path, such as steering, accelerating and/or braking. If, for example, upon evaluating the input data a pedestrian is detected, then in executing the safety-relevant function an evasion trajectory can be calculated and/or driven by the vehicle.

Here all evaluation units may be trained at least to the confidence level. Preferably the confidence level correlates with a requirement of the safety-relevant function. The confidence level can, for example, include a statistical confidence limit for correct evaluation of the specific driving situation. For example, the confidence level can include a probability value according to which the evaluation of the input data by the respective evaluation unit supplies an anticipated and/or correct result if the current driving situation corresponds to the respective specific driving situation. In particular, each of the evaluation units be tested to prove the confidence level by means of test data and/or in a calibration process.

In determining a prioritized evaluation unit, the evaluation unit may be selected from the quantity of evaluation units if its training data fit the current driving situation. The correspondence can be a full or partial correspondence. Preferably the specific driving situations for which the evaluation units are trained are classified. In this way, upon determining the prioritized evaluation unit, a classification of the current driving situation can be verified for correspondence. Preferably each classification of the specific driving situation is unequivocal, so that, depending on the current driving situation upon determination of the prioritized evaluation unit, only one of the evaluation units exhibits the correspondence with the current driving situation.

In some examples, by configuring the evaluation units to have at least a configured confidence level, it may be assured that the evaluation of the input data takes place at least at the configured confidence level. Because the evaluation units specialize in specific driving situations, the input data can thus be evaluated in a situation-specific manner. In this way, the quantity of all possible input data can be reduced for each evaluation unit, in which the individual specific driving situations can exhibit reduced complexity. By means of the predefined confidence level, improved reproducibility and/or precision in the evaluation of the input data for the safety-relevant function can be made possible.

In some examples, an operating environment for executing the safety-relevant function may be defined completely, and divided into sub-classes for defining the specific driving situation with the predefined confidence level using variations within the operating environment, preferably in which the training data of the evaluation unit are in each case allocated to one of the sub-classes. In particular the training classes may be configured to reflect the sub-classes. By means of the sub-classes, the operating environment can thus be segmented. The operating environment can, for example, include a precondition for executing the safety-relevant function. Here, the operating environment preferably includes all possible events and/or forms of the input data. By means of the division into sub-classes the infinite or nearly infinite quantity of events can be divided into a finite number of partial quantities, in which in particular improved management of the complexity of the input data is made possible. For example, the operating environment can include the existence of pedestrians. In this case the sub-classes can include, for example, pedestrians with short summer closing and longer winter clothing, in order to cover multiple cases of anticipating clothing types. Each of the sub-classes can thus form an equivalence class for the respective, specific driving situation that fulfills the confidence level. Further, it can be provided that the input data include a finite number of variations. For example, image data from the input data can be captured with 256 colors. In particular if the evaluation of the input data takes place based on color, then for example each of the evaluation units can be configured to evaluate one of the colors. In this way even a particularly complete certainty in the evaluation by the prioritized evaluation unit can be achievable.

In some examples, the method may also capture additional data for specifying the current driving situation, in which the detection of the current driving situation and/or the determination of the prioritized evaluation unit takes place depending on the classification data and the additional data. The additional data can include further parameters of the current driving situation and/or the vehicle. Here the additional data can include dynamic data and/or static data. The additional data may be provided by means of a sensor system of the vehicle, by a logic unit of the control system and/or by a server. By means of the additional data, the current driving situation can be detected with greater precision. Furthermore, in this a detailed subdivision of the operating environment into the sub-classes is made possible, in order to increase the specialization of the individual evaluation units.

In some examples, the additional data may include measured vehicle parameters and/or measured environmental data of the current driving situation. Thus, the additional data can be dynamically captured in the current driving situation. For example, the vehicle can have a sensor system for measuring the vehicle parameters and/or the environmental data. The vehicle parameters can include, for example, the vehicle's speed, the vehicle's acceleration and/or the vehicle's geographic position, such as a GPS position. The environmental data can include, for example, communication data of the communication with traffic participants, particularly in the form of Car2X data, weather data, terrain data and/or traffic data, such as traffic volume or traffic announcements. In this way, the current driving situation can be described and limited for the selection of the specific driving situation in order to reduce the complexity of the input data for the evaluation and/or to limit it to a smaller area of application.

In some examples, the detection of the current driving situation may take place by means of a logic unit and/or that the evaluation units each have at least one artificial neural network. For example, by means of the logic unit for detecting the current driving situation, a comparison of the input data with reference data can take place. For example, the logic unit can be configured to process a fixed sequence of actions, in the form of a decision tree, to detect the current driving situation. Thus, it can be provided that the input data are first classified using prescribed criteria, in particular fee of artificial intelligence, in order to then determine the prioritized evaluation unit. In this way it can be assured that the detection of the current driving situation takes place in a reproducible, i.e. preferably also provable, manner. Alternatively, the detection of the current driving situation can take place by means of artificial intelligence, in particular by means of a superordinate artificial neural network.

In some examples, the input data for detecting the classification data may be processed by the logic unit, in that the input data are tested for characteristic data for specifying the current driving situation. The logic unit can analyze the input data for detecting the current driving situation using predefined criteria, in order to detect the characteristic data. The characteristic data can include predefined data elements, for example in the form of image elements, such as a center lane for detecting a two-lane road. Using the characteristic data, the input data can be classified to determine the prioritized evaluation unit. In this way a high level of reliability in the determination of the prioritized evaluation unit can be achieved.

In some examples, for detecting the current driving situation a current parameter set is drawn up, which has the classification data and the additional data, in which in order to determine he prioritized evaluation unit the current parameter set is compared with situation-specific sets of parameters from the training data with regard to correspondence. Thus, the classification data and the additional data form the set for parameters for describing the current driving situation. Each specific driving situation for which the evaluation units are trained may be allocated to a situation-specific parameter set. In this way, determining the prioritized evaluation unit can take place simply by means of the logic unit. It is conceivable that in determining the prioritized evaluation unit an evaluation unit is selected whose situation-specific parameter set corresponds entirely to the current parameter set or whose situation-specific parameter set exhibits the greatest correspondence with the current parameter set.

In some examples, the control system in the vehicle may be integrated, preferably completely and/or that the safety-relevant function serves the complete autonomous operation of the vehicle. The control system may be integrated with the evaluation unit in a central control device of the vehicle. For the autonomous operation of the vehicle, the safety-relevant function may include steering and/or acceleration of the vehicle. By means of the integration of the control system in the vehicle the safety-relevant function can be safely executed, even if the vehicle's communicating with a server. In particular, if the safety-relevant function is configured for the autonomous operation of the vehicle, a high degree of safety can thereby be achieved, and a loss of control of the vehicle that depends on the communication connection can be prevented.

Figure 4:
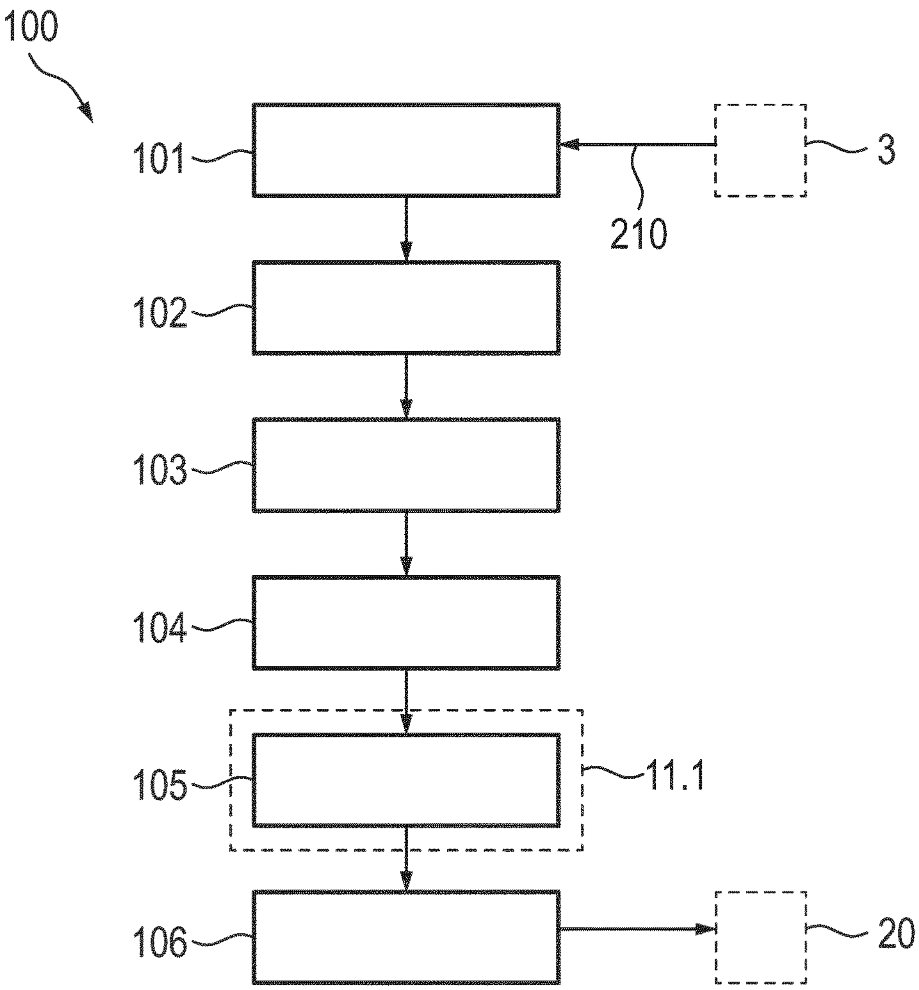
FIG. 4 illustrates process steps of the method in schematic representation, according to some aspects of the present disclosure.

FIG. 1 shows a control system 10 for executing a method 100 for executing 106 a safety-relevant function of a vehicle 1 in a current driving situation 200 of the vehicle 1 depending on input data 210 according to some aspects of the present disclosure. A sequence of process steps of the method 100 is represented schematically in FIG. 4. The method 100 may be executed by a computer program product, which includes commands that, upon execution by the control system 10, cause the control system 10 to execute the method 100.

Figure 5:
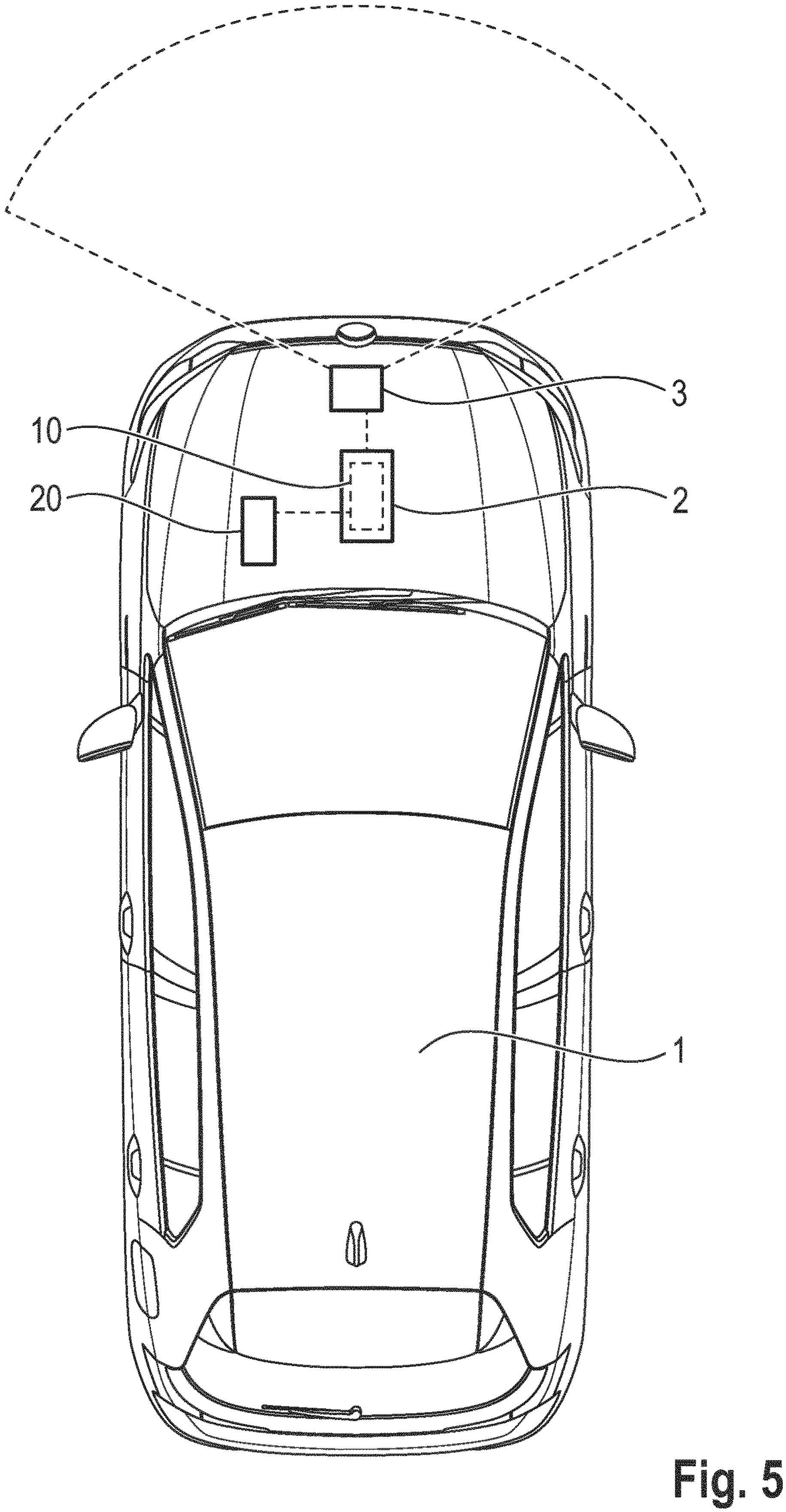
FIG. 5 illustrates a vehicle according to the invention with the control system, according to some aspects of the present disclosure.

The control system 10 may be completely integrated into a vehicle 1, as shown in FIG. 5. To this end, the control system 10 can be integrated into a control device 2 of the vehicle 1. Alternatively, however, it is likewise conceivable that the control system 10 at least partially includes a server. The vehicle 1 further includes a function unit 20 for executing 106 the safety-relevant function. For example, the function unit 20 can include a control unit for autonomous operation of the vehicle 1, e.g., to carry out an autonomous driving function.

The input data 210 can advantageously be captured by a vehicle sensor system 3, such as a vehicle camera, of the vehicle 1. The control system 10 includes a logic unit 12, by means of which the capture 101 of classification data 210.1 of the input data 210 takes place. To this end the input data 210 can be evaluated by the logic unit 12, in that the input data 210 are tested for characteristic data for specifying the current driving situation 200. In the exemplary embodiment represented in FIG. 1, for example, lane markings can be detected in capturing 101 the classification data 210.1. Further, the classification 210.1 can include, for example, information on opposing traffic, vehicles 1 parked on the shoulder, a property and/or classification of the ground below and/or of the driving area, such as an autobahn or a traffic-controlled area.

Furthermore, capture 102 of additional data 211 for specifying the current driving situation 200, in particular by means of the vehicle sensor system 3, the logic unit 12 and/or a communication unit for receipt of the additional data 211 from a server takes place. The additional data 211 can preferably include measured vehicle parameters 212 and/or measured environmental data 213 of the current driving situation 200.

Subsequently, a detection 103 of the current driving situation 200 takes place depending on the classification data 210.1 and the additional data 211. In order to describe the current driving situation 200, to detect 103 the current driving situation 200 a current parameter set 202 can be drawn up, which has the classification data 210.1 and the additional data 211. For example, the additional data 211 can include the speed of the vehicle 1, acceleration of the vehicle 1, a geographic position of the vehicle 1, communication data from communication with traffic participants, weather data, terrain data and/or traffic data. The current parameter set 202 may include measured values and/or interpreted information from the classification data 210.1 and the additional data 211.

In order to allow for predictable and/or completely traceable reproducibility in the capture 101 of classification data 210.1 and/or in the detection 103 of the current driving situation 200, the logic unit 12 is preferably configured free of artificial intelligence for executing a predefined sequence of actions.

Figure 2:
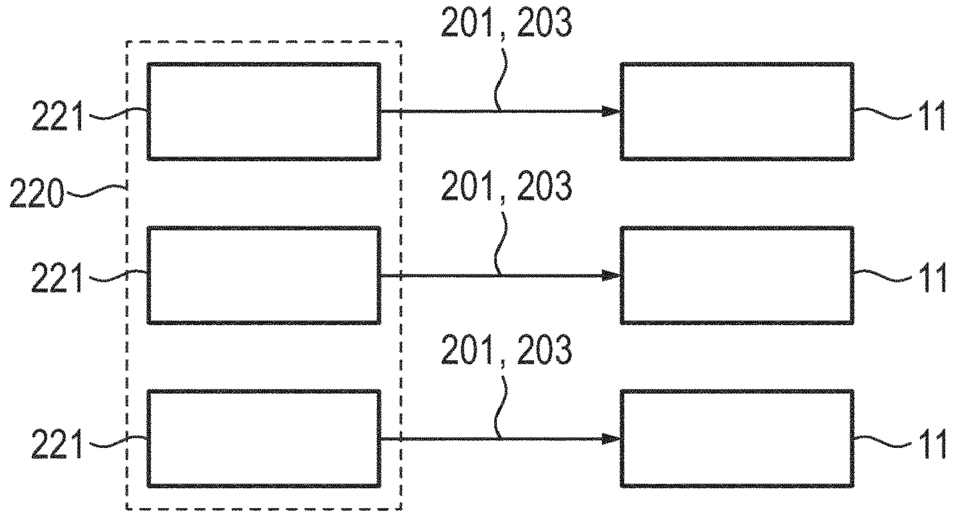
FIG. 2 illustrates training evaluation units of the control system, according to some aspects of the present disclosure.
Figure 3:
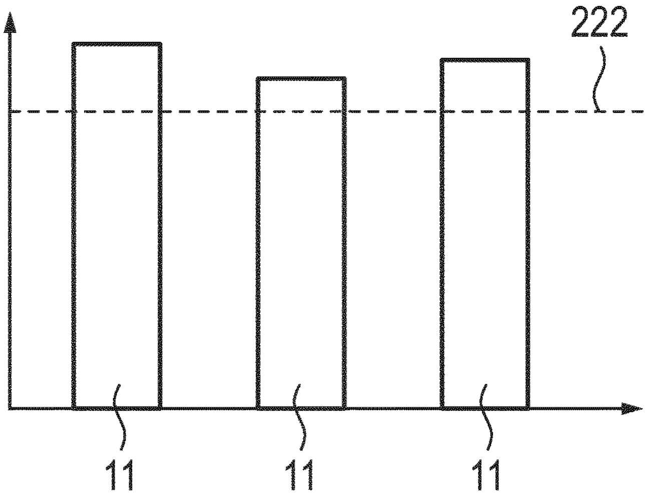
FIG. 3 illustrates a confidence level of the evaluation units, according to some aspects of the present disclosure.

Furthermore, a determination 104 of a prioritized evaluation unit 11.1 out of multiple evaluation units 11 of the control system 10 takes place. To this end, the control system 10 includes multiple evaluation units 11 for evaluating 105 the input data 210 by artificial intelligence. For example, the evaluation units 11 each may be configured with at least one neural network. All evaluation units 11 may be trained by training data at least to a predefined confidence level 222 in each case for a specific driving situation 201, as shown in FIG. 3. As shown in FIG. 2, an operating environment 220 for the execution 106 of the safety-relevant function is defined, which is divided into sub-classes 221 for defining the specific driving situations 201 with the predefined confidence level 222 using variations within the operating environment 220. The operating environment 220 can preferably include all possible events and/or forms of the input data 210. For example, the operating environment 220 can be driving on a paved road, in which the sub-classes 221 may be formed by a two-lane road, an autobahn, a one-lane road and/or the like. In this way the operating environment 220 can be divided by means of the sub-classes 221 in an abstract manner, in particular divided, in order to segment the input space of the input data 210. The training data of the evaluation units 11 may each be allocated to one of the sub-classes 221, such that the operating environment 220 may be completely reflected by the evaluating units 11. For the determination 104 of the prioritized evaluation unit 11.1 the current parameter set 202 can be compared with situation-specific parameter sets 203 of the training data with regard to correspondence.

Here, the prioritized evaluation unit 11.1 may be trained for one of the specific driving situations 201 that exhibits a correspondence with the current driving situation 200. By means of the prioritized evaluation 11.1 an evaluation 105 of the input data 210 for the safety-relevant function then takes place. In particular the prioritized evaluation unit 11.1 can be controlled by a switching module 12.1, preferably the logic unit 12, for evaluating 105 the input data 210. For example, in the evaluation of the input data 210 a motion path of traffic participants can be detected and/or a motion path of the vehicle 1 can be calculated. Depending on the evaluation 105 of the input data 210 this is followed by the execution 106 of the safety-relevant function. Here the function unit 20 can, for example, be controlled to carry out the safety-relevant function.

By means of the common confidence level 222 as minimum parameter for all evaluation units 11, it may be assured that the evaluation 105 of the input data 210 takes place at least at the level of the confidence level 222, for example for an autonomous driving function of the vehicle 1. By means of the specializations of the evaluation units 11 on the specific driving situations 201 the input data 210 can thus be evaluated in a situation-specific manner, in which the individual driving situations 201 exhibit reduced complexity. By means of the predefined confidence level 222, in particular autonomous driving at a high level of safety can be enabled.

The above explanation of the embodiments describes the present invention exclusively within the scope of examples. Naturally, individual features of the embodiments can, to the extent technically possible, be freely combined with one another without exceeding the scope of the present invention.

LIST OF REFERENCE NUMBERS

1 vehicle
2 control device
3 vehicle sensor system
10 control system
11 evaluation units
11.1 prioritized evaluation unit
12 logic unit
12.1 switching module
20 function unit
100 method
101 capture of 210.1
102 capture of 211
103 capture of 200
104 determination of 11.1
105 evaluation of 210
106 execution by 2
200 current driving situation
201 specific driving situation
202 current parameter set
203 situation-specific parameter sets
210 input data
210.1 classification data
211 additional data

220 operating environment
221 sub-class
222 confidence level

The invention claimed is:

1. A method for executing a safety-relevant function of a vehicle in a current driving situation depending on input data evaluable by a control system comprising a plurality of evaluation units, wherein each evaluation unit of the plurality of evaluation units is trained, using an individual set of training data, at least to a predefined confidence level for a respective specific driving situation, the method comprising:

detecting classification data of the input data;

detecting additional data for specifying the current driving situation;

detecting the current driving situation depending on the classification data and the additional data;

obtaining a current parameter set comprising the classification data and the additional data;

comparing the current parameter set with situation-specific parameter sets of the individual sets of training data to determine a correspondence;

determining, based on the comparison, a prioritized evaluation unit of the plurality of evaluation units, wherein the prioritized evaluation unit-that has been trained, using the individual set of training data for the prioritized evaluation unit, at least to the predefined confidence level for a specific driving situation corresponding to the detected current driving situation;

evaluating the input data via the prioritized evaluation unit; and executing the safety-relevant function by controlling at least one of steering, acceleration, or braking of the vehicle depending on the evaluation of the input data via the prioritized evaluation unit.

2. The method according to claim 1, further comprising defining an operating environment for executing the safety-relevant function, wherein the defined operating environment comprises divided sub-classes representing the respective specific driving situations for which the-plurality of evaluation units are trained to the predefined confidence level using variations within the operating environment.

3. The method according to claim 2, wherein the individual set of training data for each evaluation units of the plurality of evaluation units is allocated to one of the sub-classes.

4. The method according to claim 1, wherein the additional data comprises at least one of measured vehicle parameters or measured environmental data of the current driving situation.

5. The method according to claim 4, wherein the measured vehicle parameters comprise at least one of a speed, an acceleration, or a geographic position of the vehicle, and wherein the measured environmental data comprise at least one of communication data from communication with traffic participants, weather data, terrain data, or traffic data.

6. The method according to claim 1, wherein determining the prioritized evaluation unit comprises selecting an evaluation unit whose situation-specific parameter set exhibits a greatest correspondence with the current parameter set.

7. The method according to claim 1, wherein the control system comprises a logic unit configured free of artificial intelligence to detect the current driving situation by executing a predefined sequence of actions.

8. The method according to claim 7, further comprising testing, by the logic unit using predefined criteria, the input data for characteristic data for specifying the current driving situation.

9. The method according to claim 1, wherein the control system is integrated into the vehicle, and/or wherein the safety-relevant function is configured as an autonomous operation of the vehicle.

10. A vehicle system of a vehicle, comprising:

a function unit comprising a control unit for autonomous operation of the vehicle, the function unit being configured to execute a safety-relevant function of the vehicle in a current driving situation, wherein the safety-relevant function comprises controlling at least one of steering, acceleration, or braking of the vehicle; and a control system comprising a plurality of evaluation units for evaluating input data for the safety-relevant function, wherein each evaluation unit of the plurality of evaluation units are is trained, using an individual set of training data, at least to a predefined confidence level for a respective specific driving situation, wherein the function unit and the control system are configured to:

detect classification data of the input data;

detect additional data for specifying the current driving situation;

detect the current driving situation depending on the classification data and the additional data;

obtain a current parameter set comprising the classification data and the additional data;

compare the current parameter set with situation-specific parameter sets of the individual sets of training data to determine a correspondence;

determine, based on the comparison, a prioritized evaluation unit of the plurality of evaluation units, wherein the prioritized evaluation unit has been trained, using the individual set of training data for the prioritized evaluation unit, at least to the predefined confidence level for a specific driving situation corresponding to the detected current driving situation;

evaluate the input data via the prioritized evaluation unit; and execute, via the function unit, the safety-relevant function by controlling at least one of steering, acceleration, or braking of the vehicle depending on the evaluation of the input data via the prioritized evaluation unit.

11. The vehicle system according to claim 10, wherein the function unit and the control system are configured to define an operating environment for executing the safety-relevant function, wherein the defined operating environment comprises divided sub-classes representing the respective specific driving situations for which the plurality of evaluation units are trained to the predefined confidence level using variations within the operating environment.

12. The vehicle system according to claim 11, wherein the individual set of training data for each evaluation unit of the plurality of evaluation units are-is allocated to one of the sub-classes.

13. The vehicle system according to claim 10, wherein the additional data comprises at least one of measured vehicle parameters or measured environmental data of the current driving situation.

14. The vehicle system according to claim 13, wherein the measured vehicle parameters comprise at least one of a speed, an acceleration, or a geographic position of the vehicle, and wherein the measured environmental data comprise at least one of communication data from communication with traffic participants, weather data, terrain data, or traffic data.

15. The vehicle system according to claim 10, wherein the function unit and the control system are configured to determine the prioritized evaluation unit by selecting an evaluation unit whose situation-specific parameter set exhibits a greatest correspondence with the current parameter set.

16. The vehicle system according to claim 10, wherein the control system comprises a logic unit configured free of artificial intelligence to detect the current driving situation by executing a predefined sequence of actions.

17. The vehicle system according to claim 16, wherein the logic unit is configured to test, using predefined criteria, the input data for characteristic data for specifying the current driving situation.

18. The vehicle system according to claim 10, wherein the control system is integrated into a control device of the vehicle.

19. A computer program product comprising a non-transitory computer-readable storage medium storing program instructions which, when the program instructions are executed by one or more processors of a control system for executing a safety-relevant function of a vehicle in a current driving situation depending on input data evaluable by the control system, wherein each evaluation unit of a plurality of evaluation units of the control system is trained, using an individual set of training data, at least to a predefined confidence level for a respective specific driving situation, cause the one or more processors to:

detect classification data of the input data;

detect additional data for specifying the current driving situation;

detect the current driving situation depending on the classification data and the additional data;

obtain a current parameter set comprising the classification data and the additional data;

compare the current parameter set with situation-specific parameter sets of the individual sets of training data to determine a correspondence;

determine, based on the comparison, a prioritized evaluation unit of the plurality of evaluation units, wherein the prioritized evaluation unit has been trained, using the individual set of training data for the prioritized evaluation unit, at least to the predefined confidence level for a specific driving situation corresponding to the detected current driving situation;

evaluate the input data via the prioritized evaluation unit; and execute the safety-relevant function by controlling at least one of steering, acceleration, or braking of the vehicle depending on the evaluation of the input data via the prioritized evaluation unit.

20. The computer program product of claim 19, wherein the program instructions further cause the one or more processors to define an operating environment for executing the safety-relevant function, wherein the defined operating environment comprises divided sub-classes representing the respective specific driving situations for which the plurality of evaluation units are trained to the predefined confidence level using variations within the operating environment, and wherein the individual set of training data for each evaluation unit of the plurality of evaluation units is allocated to one of the sub-classes.

* * * * *